(12) United States Patent
Delbaere

(10) Patent No.: US 11,986,128 B2
(45) Date of Patent: May 21, 2024

(54) DEVICE FOR THE AUTOMATIC PREPARATION OF A FOOD PRODUCT AND METHOD OF OFFERING AND/OR SELLING SUCH A FOOD PRODUCT

(71) Applicant: CROP'S FRUIT, Ooigem (BE)

(72) Inventor: Pieter Delbaere, Deurle (BE)

(73) Assignee: Crop's Fruit, Ooigem (BE)

( * ) Notice: Subject to any disclaimer, the term of this patent is extended or adjusted under 35 U.S.C. 154(b) by 451 days.

(21) Appl. No.: 16/955,749

(22) PCT Filed: Dec. 18, 2018

(86) PCT No.: PCT/IB2018/060225
§ 371 (c)(1),
(2) Date: Jun. 18, 2020

(87) PCT Pub. No.: WO2019/123229
PCT Pub. Date: Jun. 27, 2019

(65) Prior Publication Data
US 2021/0007556 A1    Jan. 14, 2021

(30) Foreign Application Priority Data
Dec. 19, 2017   (BE) .................................. 2017/5959

(51) Int. Cl.
*A47J 43/042*   (2006.01)
*A47J 43/07*    (2006.01)

(52) U.S. Cl.
CPC ......... *A47J 43/042* (2013.01); *A47J 43/0716* (2013.01); *A47J 43/0727* (2013.01)

(58) Field of Classification Search
CPC ... A47J 43/042; B01F 35/7548; B01F 27/627; G07F 17/0078
See application file for complete search history.

(56) References Cited

U.S. PATENT DOCUMENTS

| 1,733,945 | A | 10/1929 | Dehuff | |
| 2016/0106259 | A1* | 4/2016 | Xu | ........................ G07F 9/105 700/275 |

FOREIGN PATENT DOCUMENTS

| GB | 756043 A | 8/1956 |
| GB | 788142 A | * 12/1957 |

(Continued)

OTHER PUBLICATIONS

Search Report for International Patent Application PCT/IB2018/060225, dated Jun. 27, 2019.

*Primary Examiner* — Elizabeth Insler
(74) *Attorney, Agent, or Firm* — FRESH IP PLC; Clifford D. Hyra; Aubrey Y. Chen

(57) ABSTRACT

The present invention relates to a device for the automatic preparation of a food product, comprising a mixture receptacle (5), in which solid ingredients are mixed, and a drive device (1-6, 16-19) to automatically tilt the mixture receptacle (5) in order to pour out the mixed ingredients into a refreshment receptacle (8) and to make them available to a user therein. The invention also relates to a method of offering a refreshment to a consumer which has been prepared in situ at a sales point and which comprises mixed solid ingredients, wherein the consumer himself introduces ingredients in solid form into a device according to the present invention, and allows the refreshment to be automatically prepared in the device.

16 Claims, 8 Drawing Sheets

(56) References Cited

FOREIGN PATENT DOCUMENTS

Figure 1:
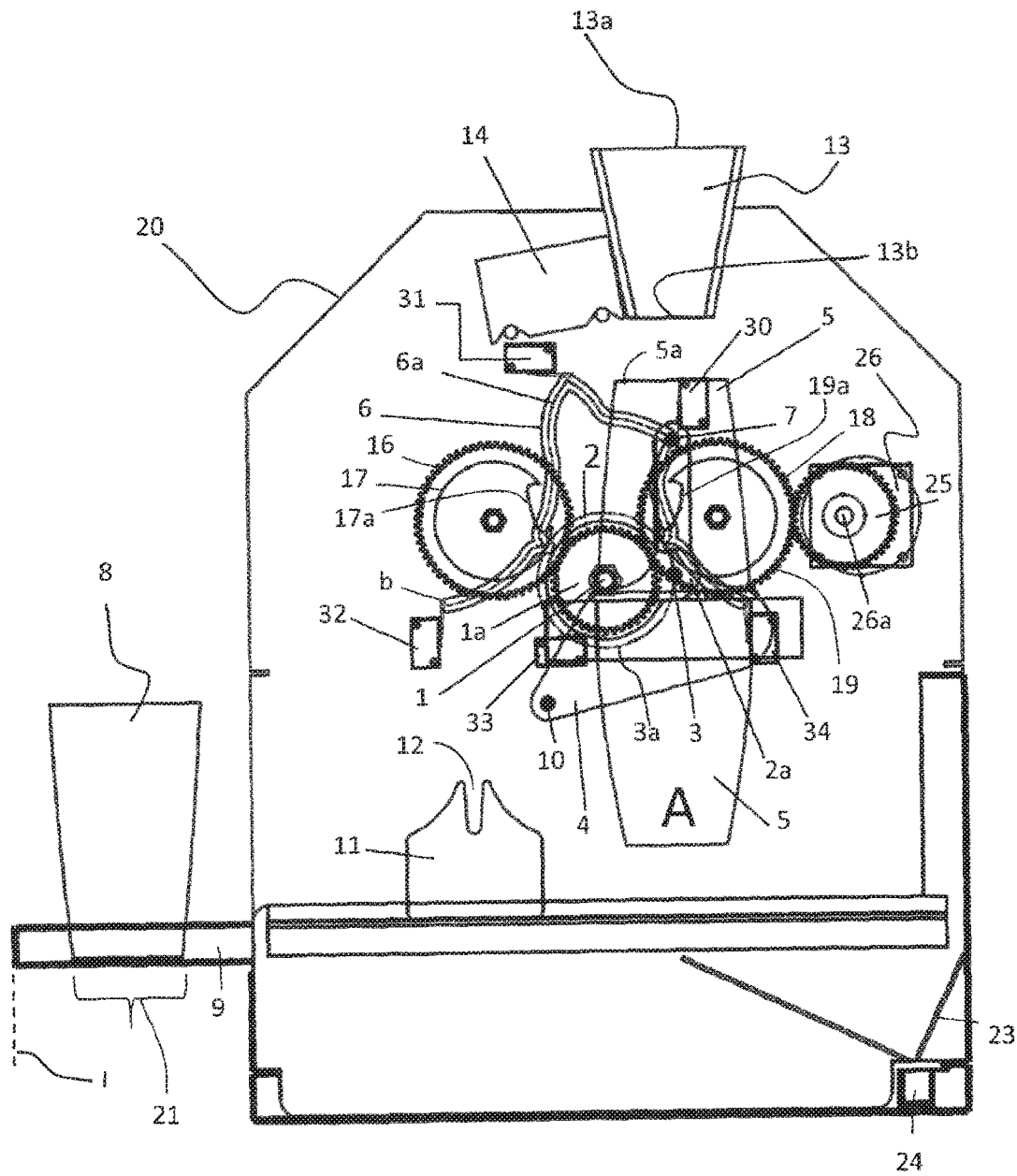

| JP | 2002165710 A | 6/2002 |
| JP | 2008259947 A | 10/2008 |
| WO | WO2004002281 A1 | 1/2004 |
| WO | WO2016018750 A1 | 2/2016 |

* cited by examiner

DEVICE FOR THE AUTOMATIC PREPARATION OF A FOOD PRODUCT AND METHOD OF OFFERING AND/OR SELLING SUCH A FOOD PRODUCT

The present invention relates, on the one hand, to a device for the automatic preparation of a food product, which preparation comprises the mixing of solid ingredients, comprising a mixture receptacle, a mixing device to mix the ingredients in the mixture receptacle, and a drive device to tilt the mixture receptacle from an upright position.

A food product, the preparation of which involves the mixing of solid ingredients, is, for example, a soup or a pure or the like, or an ice cream preparation or a yogurt or a beverage, including a milkshake or a smoothie.

In the present patent application, 'solid ingredients' is understood to mean a quantity of food product, originating from the same food product or from several different food products, which comprises one or more separate entities in a solid state. These entities are, for example, whole food products such as, for example, units of vegetables, fruit or grains, or parts of food products which are obtained by processing whole food products such as for example by breaking, grinding, cutting or mixing them or entities in respect of which the solid state is obtained by virtue of the fact that they are at least partially in a frozen state. Such frozen entities may comprise food products that are solid in a thawed state (at room temperature) and/or food products that are liquid in a thawed state, but also food products that, for example, are substantially in granular or powdered form may be provided in a frozen entity alone or together with other food products, optionally in combination with a liquid food product or water. Food products which are substantially liquid in a thawed state may, for example, also be a suspension of solid food products in a liquid.

In the present patent application, the expression 'which preparation comprises the mixing of solid ingredients' is understood to mean that, during the preparation of the food product, at least a portion of the 'solid ingredients' is mixed. The term 'mixing' must be interpreted broadly in the sense of any processing that results in a reduction in the dimensions of at least a part of the entities that are subjected to the processing. A 'mixing device' is then of course any device which is configured to mix a number of entities.

The present invention also relates to a method of offering a refreshment to a consumer which has been prepared in situ at a sales point and the preparation of which involves mixing solid ingredients.

A known apparatus for automatically preparing a smoothie is described in international patent publication WO 2016/018750 A1. This apparatus comprises a cup and a lid in which a rotatable blade is integrated. The ingredients, pieces of vegetables and/or fruit in solid form, are placed into the cup in a frozen state, for example. The cup is then moved towards an upturned position so that the ingredients can be mixed by the rotating blade on the lid. The prepared product is finally offered to the user of the apparatus in the same cup. WO 2005/070271 A2 describes an apparatus having a similar function for preparing, inter alia, milkshakes.

In these known apparatuses, the material and the form and the dimensions of the cup must be suitable for mixing in the solid ingredients in an efficient manner with the aid of the mixing device provided in the apparatus. On the other hand, it is desirable to offer the prepared food product to the consumer in a cup which is made from a suitable material and the form and dimensions of which are aesthetically appealing and user-friendly. These requirements limit the possibilities when selecting the form, the dimensions and the material from which the cup is made, while also limiting the freedom when designing the apparatuses themselves.

It is an object of the present invention to provide such a device for the automatic preparation of a food product which overcomes these drawbacks.

This object is achieved by providing a device for the automatic preparation of a food product, which preparation comprises the mixing of solid ingredients, comprising a mixture receptacle, a mixing device to mix the ingredients in the mixture receptacle and a drive device to tilt the mixture receptacle, and also according to this invention characterized in that the device is configured to make the prepared food product available to a user in a refreshment receptacle, and in that the drive device is configured to tilt the mixture receptacle automatically from an upright position into a first pouring position after the ingredients have been mixed, in order to allow the mixed ingredients to drop from the mixture receptacle into the refreshment receptacle.

As a result, the mixture receptacle can be configured to have properties that are adapted only for mixing the ingredients, and the refreshment receptacle can be configured to have properties that are adapted only for consumption of the ingredient.

The mixture receptacle may, for example, have a form and dimensions that promote the fast and efficient mixing of the solid ingredients and may, for example, be made from a rigid and durable material which is easily cleanable. It is also easy to adapt the form and the dimensions of the mixture receptacle to the mixing device. As a result, it is also readily possible to configure the mixing device to have a modified form and/or dimensions and/or to provide it in a different location in the device, as a result of which there is a greater design freedom when designing a device according to the present invention. Apart from that, it is possible to give the refreshment receptacle a form and dimensions that are aesthetically appealing to the user and that promote enjoyable consumption of the prepared food product. The material from which the refreshment receptacle is made can also be better adapted to the circumstances in which this consumption takes places. If it is a refreshment receptacle for single use, it may be made, for example, from a relatively inexpensive material which is easy to recycle.

Another object of the present invention is to provide such a device, the movable parts of which are driven by a very simple drive mechanism.

This object is achieved by providing a device according to the invention in which the mixture receptacle is rotatable about a rotary shaft which is movable along a first guide track by a drive device, wherein the mixture receptacle comprises a guide element which is configured to be moved along a second guide track, and wherein a movement of the rotary shaft according to the first movement path causes a movement of the guide element along the second movement path and moves the mixture receptacle from the upright position into the first pouring position.

In this way, the mixture receptacle can be moved, by means of one drive motor and simple mechanical drive and guide means, into a position in which the mixed ingredients are poured into a refreshment receptacle.

In a particularly preferred embodiment, the device is configured to introduce a cleaning liquid into the mixture receptacle in order to clean the mixture receptacle after the mixed ingredients have been removed from the mixture receptacle in order to then carry out a cleaning operation, and to then automatically tilt the mixture receptacle to a second pouring position in order to pour out the cleaning liquid.

The cleaning operation, for example, is for when the mixing device has been in operation for a certain amount of time.

The guide element is preferably also configured to be moved along a third guide track, wherein a movement of the rotary shaft along the first movement path causes a movement of the guide element along the third movement path and moves the mixture receptacle from the upright position into the second pouring position.

As a result, the mixture receptacle can be moved into the first and the second pouring position using the same drive motor.

In a particularly simple and efficient embodiment, the second and the third movement path are determined by two different parts of the same guide means. A guide means is, for example, a guide surface over which the guide element can move while it remains in contact with the surface. It may also be a guide groove in which the guide element is accommodated and in which it can move in the longitudinal direction of the groove. The guide surface and the guide groove then determine the movement path of the guide element.

The guide means may, for example, also be a continuous guide groove or a continuous guide surface with a certain length, consisting of a left-hand part and a right-hand part on either side of an imaginary boundary. The left-hand part extends from the boundary to the left-hand end of the guide means, and determines the second guide track. The right-hand part extends from the boundary to the right-hand end of the guide means and determines the third guide track. This may also be reversed, in which case the left-hand part and the right-hand part of the guide means determine the third and the second guide track, respectively.

The guide element may be made to interact with, optionally, the left-hand part or the right-hand part of the guide means. By moving the guide element in the direction of the respective associated end of the guide means along the second movement path or along the third movement path, the mixture receptacle is moved to the first pouring position or the second pouring position, respectively.

In a preferred embodiment, the device comprises an entrainment body which is rotatable by a drive shaft, said rotary shaft of the mixture receptacle is connected to the entrainment body in a location which is remote from the drive shaft, and the device is configured to rotate the drive shaft automatically so that the entrainment body co-rotates with and the rotary shaft is moved along a first movement path which is substantially in the shape of an arc of a circle.

In this way, the different movements of the mixture receptacle can be driven by one drive motor with a rotating drive shaft. Motors which bring about a linear movement are thus not necessary here.

The mixing device preferably also comprises a rotatable cutting blade which is situated in the mixture receptacle.

In a highly preferred embodiment, the device comprises a carrier for the refreshment receptacle, the carrier is movable between a first and a second position in order to move a refreshment receptacle which has been placed thereon into an external position or an internal position, respectively, wherein, in the external position, the refreshment receptacle is in a position in which it is accessible to a user, and wherein, in the internal position, the refreshment receptacle is in a position in which the mixed ingredients can drop into the refreshment receptacle from the mixture receptacle placed in the first pouring position, the device comprises a mechanism which comprises a component which is movable by the drive shaft and is configured to transfer the movement of the component to the carrier during a movement of the mixture receptacle towards the first pouring position, so that the carrier is automatically moved to the second position, and to transfer the movement of the component to the carrier during a movement of the mixture receptacle away from the first pouring position, so that the carrier is automatically moved to the first position.

For this purpose, the said mechanism preferably comprises an engagement means which forms part of the said component or is connected thereto, and an engagement body which forms part of the carrier or is connected thereto, and the engagement means engages with the engagement body during the movement, so that the movement is transferred to the carrier as a result of which the latter is moved.

Furthermore, the device may also comprise feed and metering means in order to add a specific amount of a liquid ingredient to the mixture receptacle during each preparation stage. A liquid ingredient is, for example, water or milk or fruit juice or a mixture of two or more liquids or a suspension of solid constituents in a liquid.

In the most preferred embodiment, the device is suitable for preparing a smoothie, and the preparation comprises the mixing of pieces of fruit and/or vegetables in a frozen state.

In particular, the invention relates to an apparatus or a machine which is configured to automatically prepare a beverage consisting of mixed ingredients, wherein the ingredients, preferably ingredients in a frozen state, are mixed in a mixture receptacle after activation of the apparatus, and wherein the mixed ingredients are then automatically moved into a refreshment receptacle together with a liquid ingredient added in the apparatus and offered to the consumer as a beverage which is ready for consumption, and wherein the mixture receptacle is also automatically cleaned after each preparation stage.

Preferably, a liquid ingredient is thus also automatically added to the mixed ingredients, such as for example milk, water or fruit juice. To this end, the apparatus comprises a reservoir which contains the liquid ingredient and is further preferably also provided with a controllable pump in order to add a predetermined quantity of the liquid ingredient to the mixture receptacle in each preparation stage.

The apparatus may, for example, be configured as a machine. In a possible application, the apparatus would be arranged in a self-service restaurant, where, for example, it can be operated by the customers themselves after payment.

This relates in particular to such an apparatus for the automatic preparation of smoothies. A smoothie is a non-alcoholic, cold beverage, usually creamy and consisting of mixed fruit and/or vegetables, and is prepared by mixing pieces of fruit and/or vegetables together with fruit juice or with a liquid milk product (yogurt, milk, cream, etc.).

The movements of the receptacle may be carried out by means of one single drive motor. As a result, the device may be realized simply and at relatively low cost, and is also easily repairable.

The method according to the present invention is characterized in that (a) a quantity of ingredients in solid form is provided to a consumer, (b) a device for the automatic preparation of a food product according to the present invention is made available to the consumer in the vicinity of the sales point, (c) the consumer introduces the said quantity of ingredients into the device, and (d) the refreshment is prepared automatically in the device and is offered to the consumer.

By using this method, a proprietor or employee of a sales point can significantly reduce the working time required for each refreshment sold. The consumer is given control over the preparation of his refreshment. In this way, he can immediately carry out the preparation stage or postpone it until a later time. The apparatus may, for example, be provided with the capability to allow the user to adjust certain parameters of the preparation. For instance, the apparatus could be provided with adjusting and regulating means in order to adjust the duration of the mixing so that the consumer himself can determine the fineness to which he wishes to mix the solid ingredients, or the consumer himself could determine how much liquid ingredient is added to the mixed ingredients.

The refreshment is, for example, a beverage which is prepared by mixing pieces of fruit and/or vegetables. The required quantity of solid ingredients may, in a first step (a), be purchased by the consumer, for example in a sealed packaging which contains a standard quantity of ingredients for preparing a refreshment. In this case, the consumer can select from different types of fruit or vegetables or different combinations of several types of fruit and/or vegetables. The consumer can then have at his disposal a device according to the invention, and deposit the purchased ingredients in the apparatus in order to allow his refreshment to be prepared automatically.

The pieces of fruit and/or vegetables are preferably in a frozen state. For each preparation stage, a liquid ingredient, preferably fruit juice, is preferably also added to the mixture receptacle.

According to a preferred method, the ingredients are provided to the consumer in a frozen state and are introduced into the apparatus by the consumer in a frozen state. The ingredients are preferably frozen by an IQF method as a quantity of separate entities.

Preferably, the method is applied in such a way that the consumer, prior to carrying out step a, first selects different ingredients or different combinations of two or more different ingredients which are offered at the sales point.

The quantity of ingredients which is needed in order to prepare the desired refreshment is preferably sold as a separately packaged unit.

The refreshment which is prepared and offered according to this method is preferably a drinkable refreshment, such as a soup, a milkshake or a smoothie.

The method preferably also comprises that the consumer selects different ingredients or different combinations of two or more different ingredients, and places his order via a web application.

In order to explain the features and advantages of the invention in more detail, a possible embodiment of an apparatus according to the present invention will be explained in detail below. It will be clear that this is only an example of the many possible embodiments and areas of application within the context of the invention, and that the following description can in no way be considered as a limitation of the scope of the protection defined in the claims.

Figure 2:
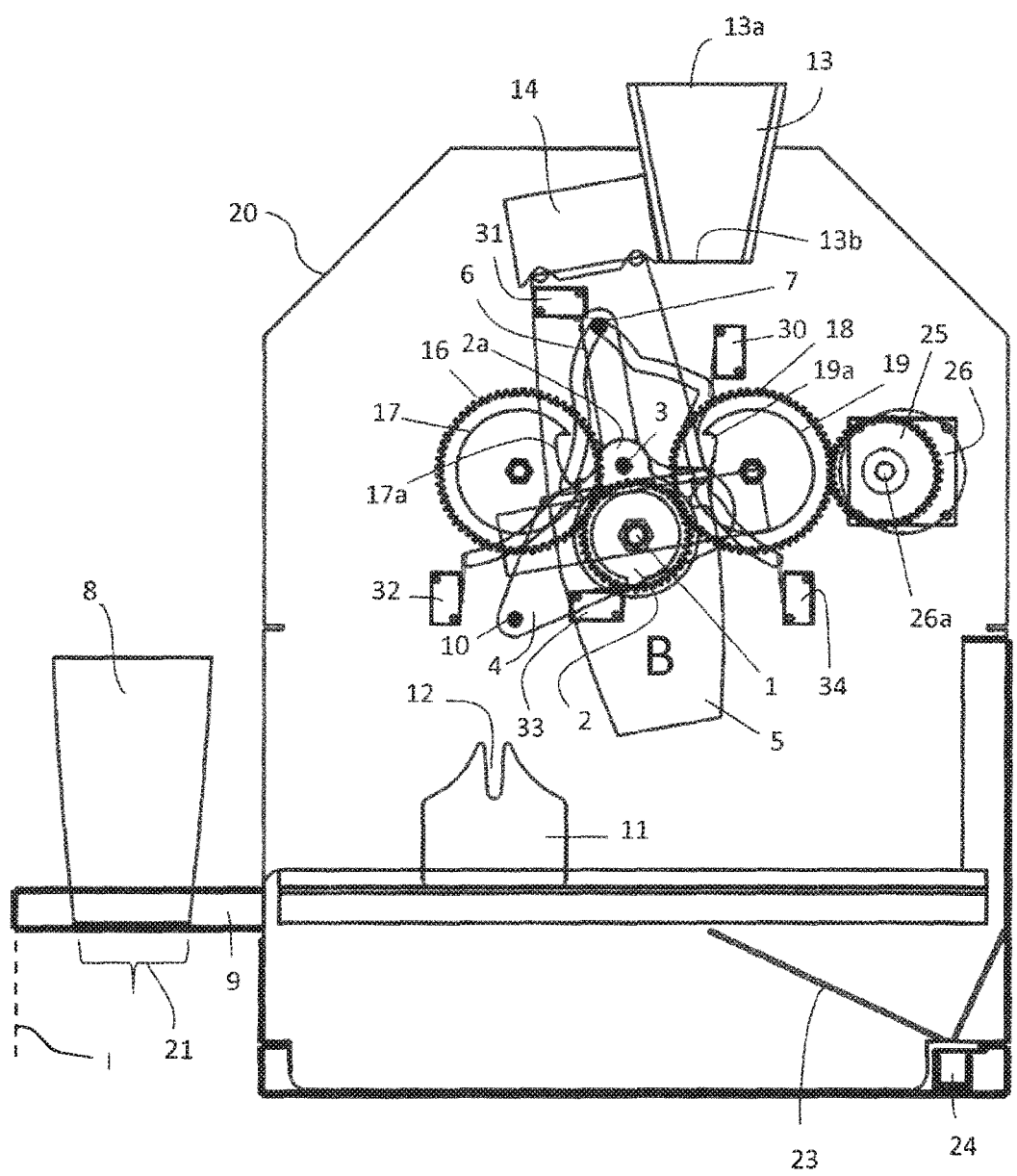
Figure 3:
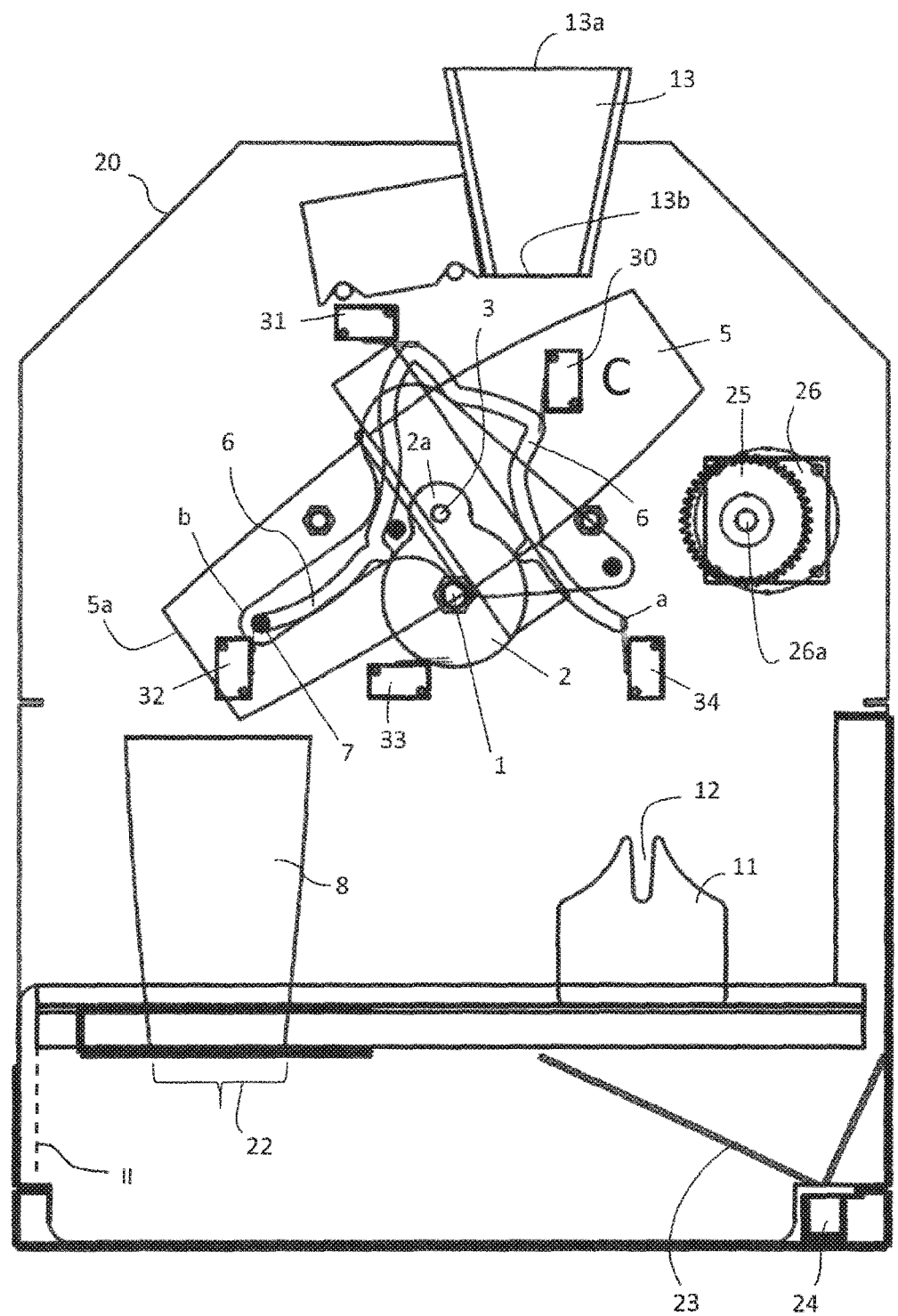
Figure 4:
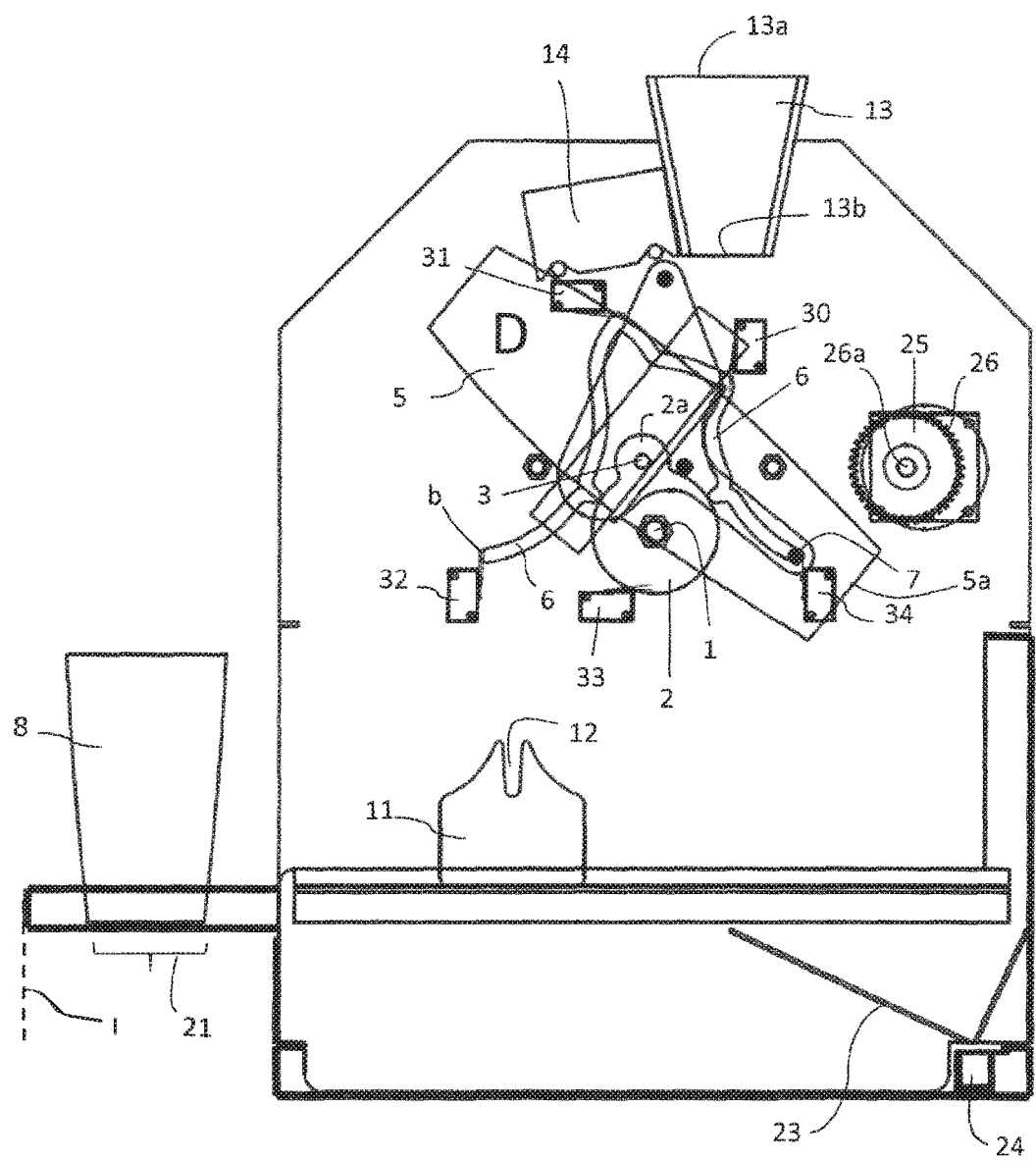
Figure 5:
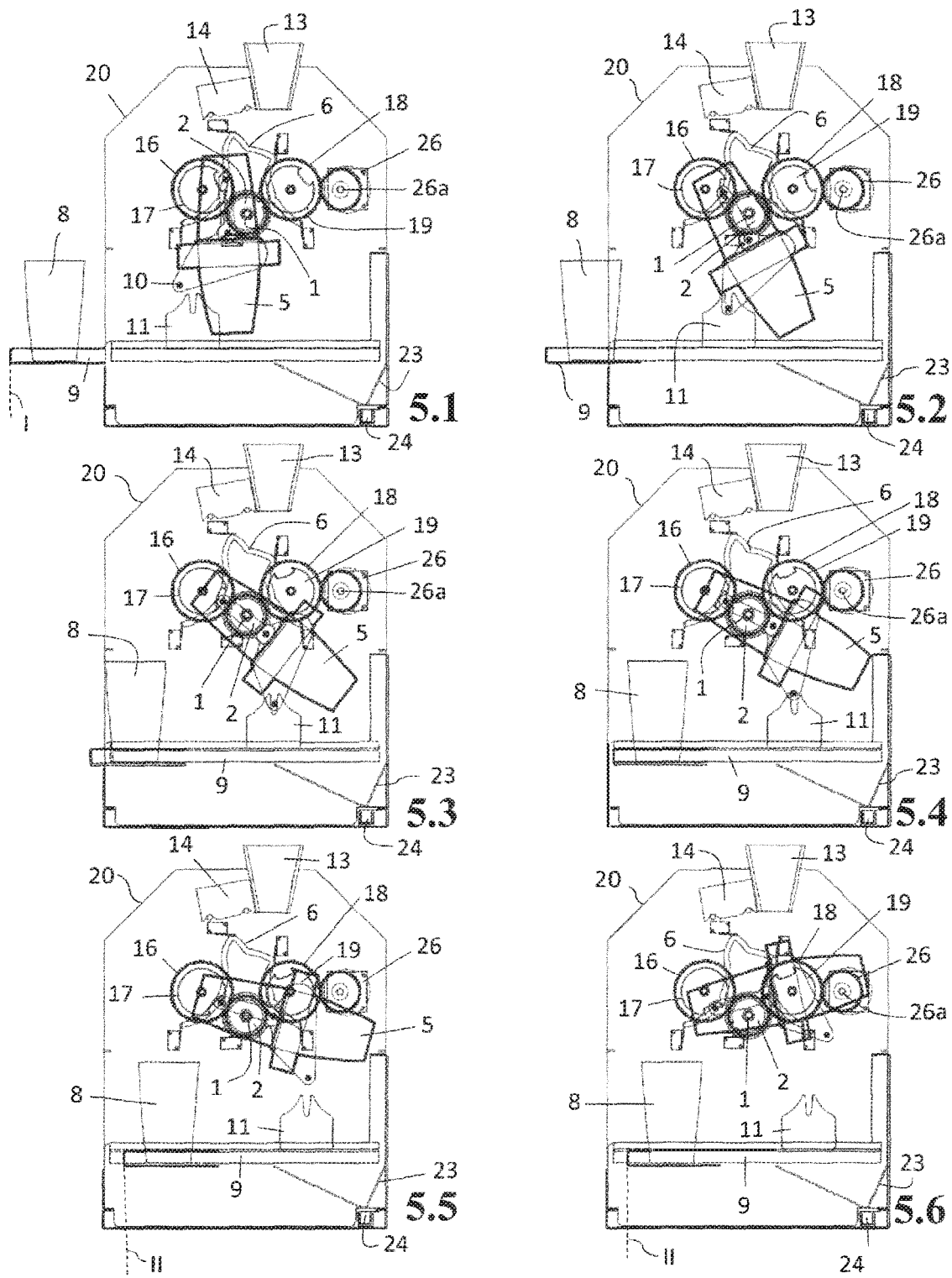
Figure 6:
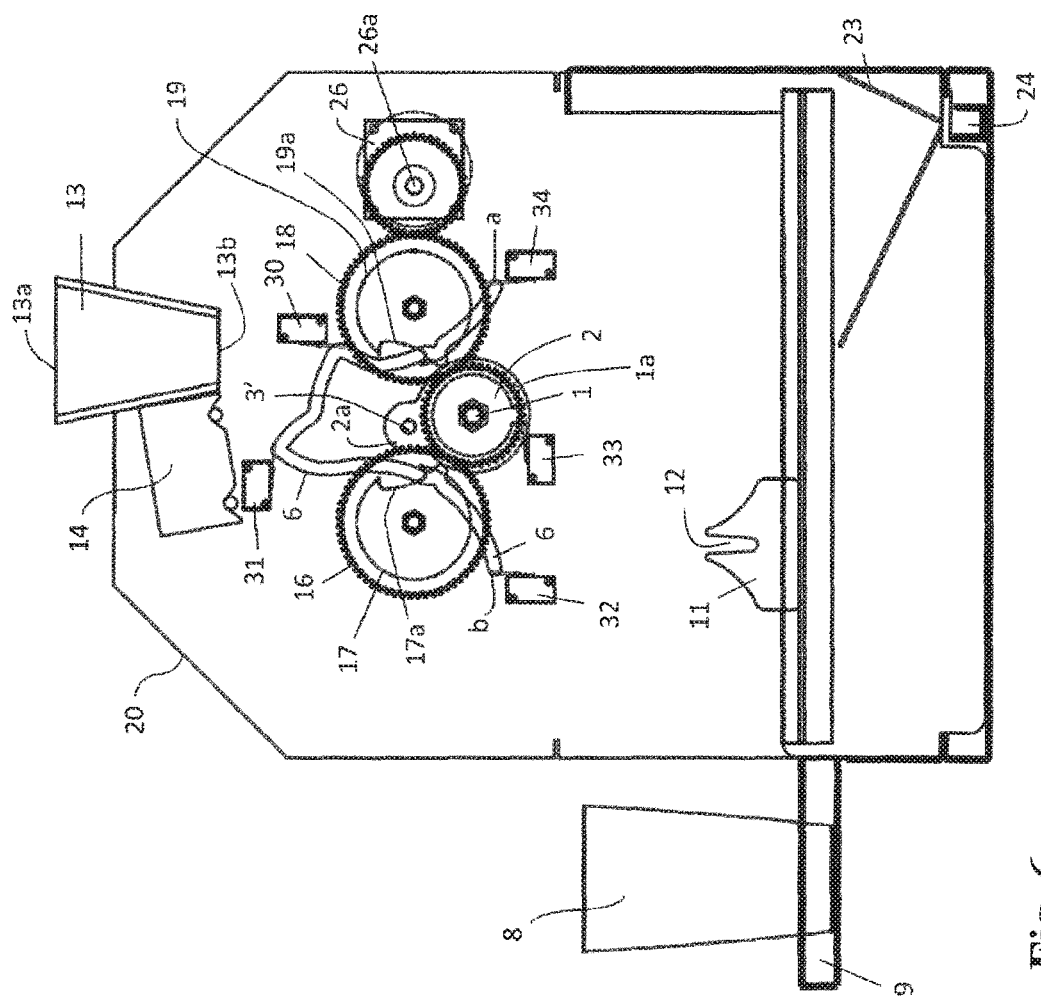
Figure 6:
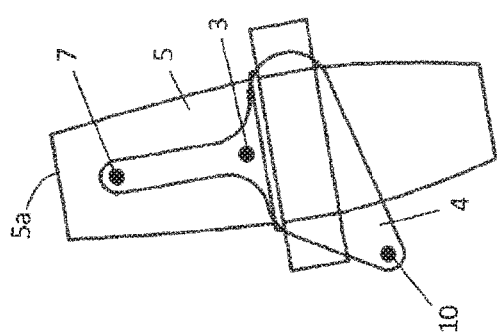
Figure 7:
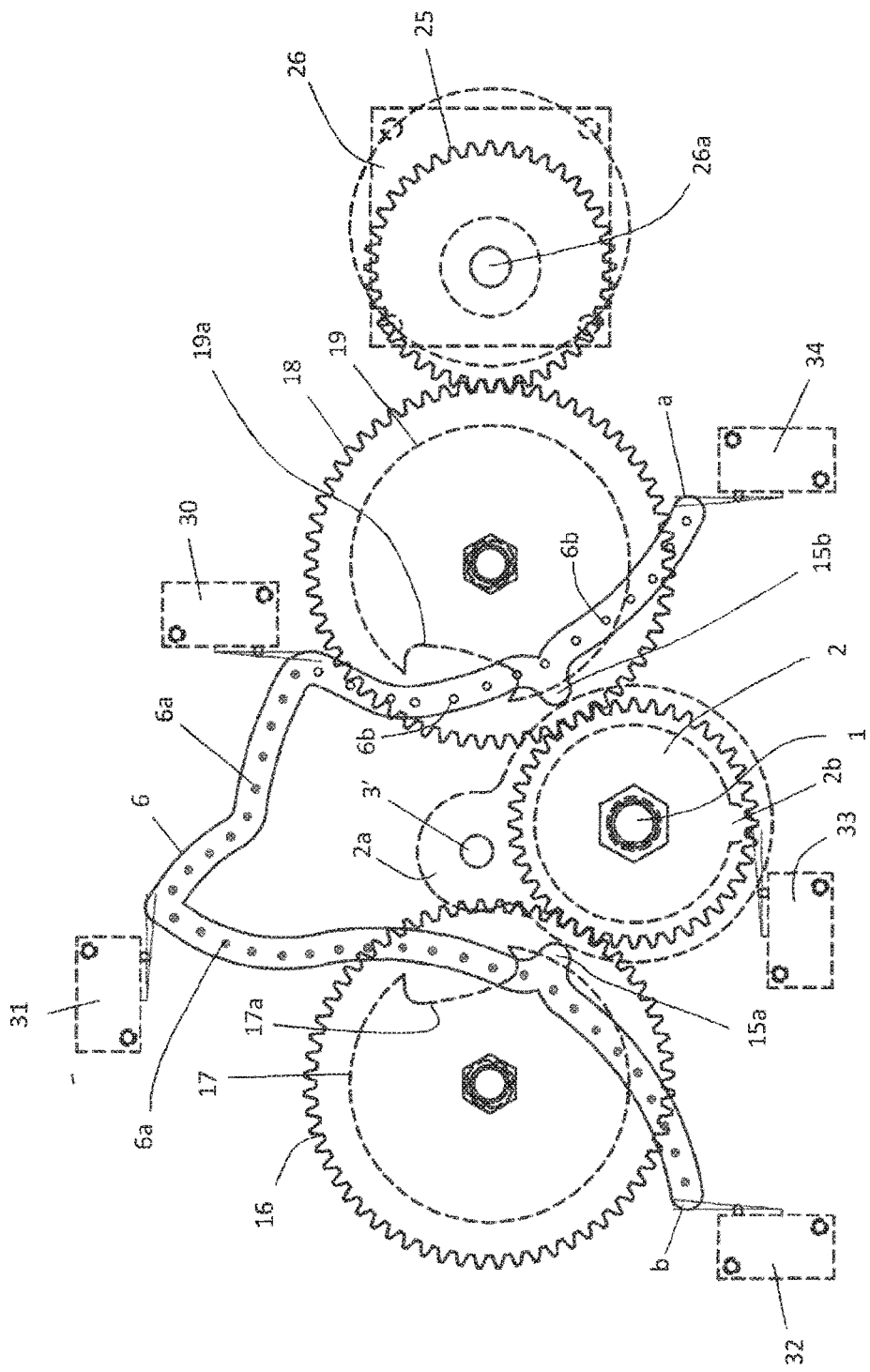
Figure 8:
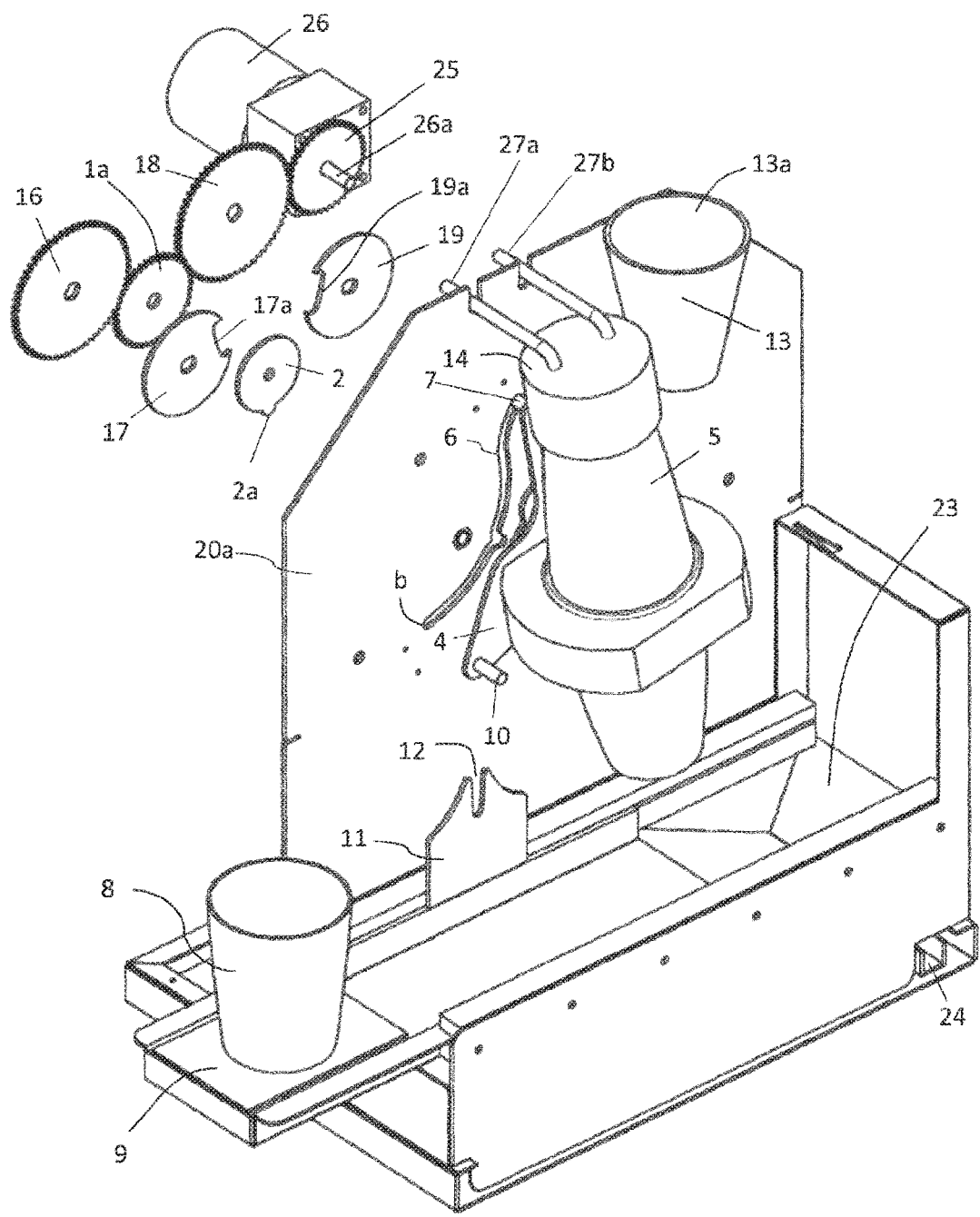

In this detailed description, reference numerals are used to refer to the attached figures, each of which show a side view of the apparatus in which the front wall of the housing has been removed, and on which the most important components are diagrammatically indicated, in which FIGS. 1 to 4 show a mixture receptacle (a blender) and a refreshment receptacle (a drinking cup) of the apparatus and their respective movement mechanisms in different positions during the operation of the apparatus, wherein in FIG. 1, the blender and the drinking cup are in the starting position, in which the blender is ready to be provided with ingredients via the feed funnel and the drinking cup is empty outside the housing;

in FIG. 2, the blender is in a slightly inclined position against a sealing element and is ready to mix the ingredients, and the drinking cup is still empty outside the housing;

in FIG. 3, the drinking cup is moved to a position within the housing and the blender is in a pouring position which is tilted to the left in order to pour the mixed ingredients into the drinking cup;

in FIG. 4, the filled drinking cup is moved back to a position outside the housing and the blender is in a pouring position tilted to the right in order to pour out the cleaning water which has meanwhile been introduced; and in FIG. 5, the six images 5.1 to 5.6 show six successive positions of the blender and the drinking cup and their movement mechanisms during the transition from the situation of FIG. 2 to the situation of FIG. 3, FIG. 6 shows the apparatus and its movement mechanism after removal of the blender and its attachment plate, wherein the removed components are diagrammatically illustrated separately next to the apparatus, FIG. 7 separately shows the components of the movement mechanism shown in FIG. 6 without the blender and its attachment plate, and FIG. 8 shows the apparatus in perspective, wherein the drive motor, the gears, the cam surfaces and the entrainment plate have been removed from the apparatus and are separately shown in exploded state above the apparatus.

The apparatus comprises a housing (20) in which a blender (5) with an open top side (5*a*) is provided. The blender (5) is movable and tiltable by means of a drive shaft (1) driven by a drive motor (26) and via a movement mechanism (1, 1*a*, 2-7, 16-19) driven by the drive shaft (1).

The drive motor (26) has a motor shaft (26*a*) to which a gear (25) is attached. This gear (25) engages with the gear (18) of a first gear/cam wheel combination (18, 19) which is provided rotatably on a fixed shaft. The gear (18) engages with a drive gear (1*a*) which is attached to said drive shaft (1), so that this drive shaft (1) is driven by the motor (26) via said gears (25), (18), (1*a*).

The blender (5) is attached to an attachment plate (4) and this attachment plate (4) is in turn rotatably connected via a rotary shaft (3) to a protruding edge portion (2*a*) of an entrainment plate (2). The blender (5) is fixedly connected to the attachment plate and is thus rotatable with respect to the rotary shaft (3) together with the attachment plate (4).

The entrainment plate (2) is attached to the drive shaft (1), so that it co-rotates about the drive shaft (1) due to the rotation of the drive shaft (1). By rotating the drive shaft (1), the entrainment plate (2) is rotated and the attachment plate (4) connected thereto is entrained, wherein the rotary shaft (3) is moved around the drive shaft (1) along an arc of a circle (3*a*). This arc of a circle is indicated only in FIG. 1.

In the space within the housing (20), a wall (20*a*) is also provided (see FIG. 8) in which a guide groove (6) is provided that extends along a specific route and has a right-hand end (a) and a left-hand end (b). The attachment plate (4) comprises a guide pin (7) which is accommodated in said guide groove (6) so that it is movable in this groove (6).

In the top side of the housing (20) there is an integrated feed funnel (13), the open top side (13*a*) of which is located outside the housing (20) and the outlet opening (13*b*) of which is located inside the housing (20). The outlet opening (13*b*) of the funnel (13) is located precisely above the open top side (5a) of the blender (5) when this is in the upright position (A) (see FIG. 1). In this position (A), the blender (5) is ready to be provided with a quantity of solid ingredients via the feed funnel (13). The corresponding position of the guide pin (7) in the groove (6) is detected by means of a first microswitch (30).

In order to prepare a food product with mixed ingredients, a user will deposit a suitable quantity of solid ingredients in the feed funnel (13) and activate the apparatus, for example via a control screen or by inserting coins or a payment card or via a web application developed for this purpose.

The motor (26) will drive the drive shaft (1) so that the drive shaft (1) rotates anticlockwise. The course of the groove (6) is such that, during the anticlockwise rotation of the drive shaft (1) and the entrainment plate (2), the blender (5) tilts from the upright position (A) of FIG. 1 towards the left. In this case, the guide pin (7) is moved from its position illustrated in FIG. 1 towards the left in the groove (6). This left-hand portion of the guide groove (6) determines a movement path (6a) which is indicated by means of dots in FIG. 7.

When the blender (5) is in the tilted position (B) illustrated in FIG. 2, the position of the guide pin (7) in the groove (6) is detected by means of a second microswitch (31). As a result of this detection, the motor (26) is switched off by means of known control means. This stops the tilting movement of the blender (5).

In this tilted position (B), the open top side (5a) of the blender (5) is positioned against the bottom side of a sealing element (14) (see FIG. 2). In this position (B), the blender (5) is ready to mix the ingredients that have been placed therein. At the bottom of the blender (5), a rotatable blade is provided for this purpose which is drivable by an electric motor. The blade and the motor of the mixing device are not illustrated in the figures. When the blender (5) is perfectly in the mixing position, the cam (2b) of the entrainment plate (2) is located in the position that is detected by microswitch (33) (see FIG. 7). The microswitch (33) is further referred to as the fifth microswitch. This detection generates a signal which automatically activates the mixing device for a specific time.

Two supply lines (27a), (27b) are connected to the sealing element (14) (see FIG. 8). Along one supply line (27a), a certain quantity of liquid ingredient, such as for example water or milk or fruit juice, can be added into the blender (5) from a reservoir (not illustrated in the figures).

The apparatus is provided with an electric pump (not illustrated in the figures) and associated control means for introducing a specific quantity of a liquid ingredient from a reservoir into the blender (5) via the supply line (27a) during each preparation stage.

The other supply line (27b) is provided in order to supply cleaning water for cleaning the blender (5), as is explained in more detail below.

A consumer can select which food product he wishes to prepare using the apparatus on a control screen (not illustrated in the figures). Depending on this selection, the one or the other liquid food product is automatically supplied via the relevant supply line (27a). Meanwhile, or thereafter, the motor of the mixing device is automatically driven for a specific time and all ingredients are mixed in the blender (5). The duration of the mixing may be adjustable or may be automatically determined on the basis of the selected preparation.

After mixing, the drive motor (26) is once again activated automatically in order to rotate the drive shaft (1) and the entrainment plate (2) further anticlockwise. The guide pin (7) will in this case move further towards the left-hand end (b) in the groove (6). In this portion, the groove (6) comprises a local widening (15a) in which the guide pin (7) is retained for a certain time while the rotary shaft (3) is moved upwards by the rotating entrainment plate (2), in order to thus obtain an efficient pouring motion wherein the blender (5) carries out a rotational movement with respect to the retained guide pin (7).

In order to retain the guide pin (7) in the widening (15a) of the groove, a second gear/cam wheel combination (16) is provided in the vicinity of the widening (15a) so as to be rotatable on a fixed shaft. The drive gear (2) engages with this gear (16), as a result of which both the gear (16) and the cam wheel (17) are rotated clockwise about their shaft. A recess (17a) is provided in the edge area of the cam wheel (17). When the guide pin (7) approaches the widening (15a) in the groove (6), the recess (17a) is located in such a position with respect to the widening (15a) that the guide pin (7) gains access to the widening (15a). When the guide pin (7) is in the widening (15a), the cam wheel (17) meanwhile is rotated further clockwise so that the walls of cam wheel (17) that delimit the recess on both sides (17a) prevent the guide pin (5) from leaving this widening (15a). As a result, the guide pin (7) is retained in the widening (15a).

Meanwhile, the rotary shaft (3) of the blender (5) is moved upwards by the rotating entrainment plate (2), in order to thus cause the blender (5) to carry out a rotational movement with respect to the retained guide pin (7). This movement results in a very smooth and effective pouring motion (see FIG. 5).

Due to the further clockwise rotation of the cam wheel (17), the recess (17a) is moved into such a position that the guide pin (7) can leave the widening (15a) and can move in the direction of the left-hand end (b) of the groove (6). The upper boundary of the recess (17a) then prevents the pin (7) from being able to move back upwards out of the recess (15a) and from moving away from the left-hand end (b) of the groove (6) again.

Due to the fact that the drive shaft (1) and the entrainment plate (2) rotate further anticlockwise, the guide pin (7) is moved further up to the left-hand end (b) of the groove (6). In this position (C), the blender (5) is tilted fully to the left, so that the contents of the blender (5) are poured into the drinking cup (8). This position of the guide pin (7) is detected by means of a third microswitch (32). In FIG. 3, the blender (5) is in this position (C).

At the bottom of the housing (20), a carrier (9) that is slidable to and fro in a horizontal direction is also provided for a drinking cup (8). The carrier (9) is slidable between a leftmost position (I)—see FIGS. 1, 2 and 4—and a rightmost position (II), as illustrated in FIG. 3. If the carrier (9) is in the leftmost position (I), the drinking cup (8) is in a position outside the housing (20)—referred to as the external position (21)—where it is accessible to a user. If the carrier (9) is in the rightmost position (II), the drinking cup (8) is in a position inside the housing (20)—referred to as the internal position (22)—where the mixed ingredients can drop into the drinking cup (8) from the blender (5) which is situated in the first pouring position (C).

In order to automatically move the carrier (9), the attachment plate (4) comprises an entrainment pin (10) and a vertically arranged engagement plate (11) is provided on the top surface of the carrier (9) in which a vertical groove (12) is provided which ends at the top edge of the engagement plate (11). During a movement of the blender (5) towards the first pouring position (C), the entrainment pin (10) of the attachment plate (4) ends up in the vertical groove (12) of the engagement plate (11), as a result of which the carrier (9) is entrained towards the rightmost position (II) during the further movement of the entrainment pin (10).

This is illustrated by the successive situations shown in images 5.1 to 5.6 of FIG. 5. As a result of this movement of the carrier (9), an empty drinking cup (8) that the user has placed on the carrier is moved to the internal position (22). When the guide pin (7) is located in the widening (15a) of the groove and the blender (5) is tilted further (this is the situation in image 5.4), the carrier (9) is located in the rightmost position (II) and the entrainment pin (10) leaves the groove (12) in the engagement plate (11). By eventually moving the blender (5) into the first pouring position (C), the drinking cup (8) is filled with the prepared refreshment.

In the case of the reverse movement, in which the blender (5) moves from the first pouring position (C) of FIG. 3 back to the position (B) of FIG. 2, the successive situations of images 5.1 to 5.6 are passed through in the reverse order and the carrier (9) will also be entrained in the reverse direction by the entrainment pin (10) and moved to the leftmost position (I) again. The filled drinking cup (8) is thus moved into the external position (21) again where the user can take it.

Subsequently, the blender (5) is moved back into the position (B) against the sealing element (14) and warm water is introduced into the blender (5) via the feed line (27b) in this sealing element (14) in order to clean the blender. The mixing device is activated for a short time in order to thoroughly clean the inside of the blender (5) and the parts of the mixing device located therein. The blender (5) is then moved into the second pouring position (D) (see FIG. 4). The cleaning water is poured into a collecting tray (23) of the apparatus, from where it is led away via a drain channel (24).

During the movement of the blender (5) from the upright position (A) to the second pouring position (D), the guide pin (7) is moved into the right-hand part of the guide groove (6). This right-hand part of the guide groove (6) determines a movement path (6b) that is different from the movement path (6a) that is determined by the left-hand part of the guide groove (6). This right-hand movement path (6b) is indicated in FIG. 7 by means of small circles.

The drive shaft (1) and the entrainment plate (2) now rotate clockwise so that the rotary shaft (3) is moved along an arc of a circle (3) and the guide pin (7) follows the route (6b) of the right-hand part of the groove (6) until the right-hand end (a) of the groove (6) is reached.

In this right-hand portion, the groove (6) also comprises a local widening (15b), in which the guide pin (7) can be retained for a certain time. Retaining the guide pin (7) in this widening (15b) is brought about by interaction with the cam wheel (19) of the first gear/cam wheel combination (18, 19). The operation is analogous to what was described above in relation to the widening (15a) of the left-hand portion of the guide groove (6).

A recess (19a) is also provided in the edge area of the cam wheel (19). When the guide pin (7) approaches the widening (15b) in the groove (6), the recess (19a) is located in such a position with respect to the widening (15b) that the guide pin (7) gains access to the widening (15b). When the guide pin (7) is in the widening (15b), the cam wheel (19) meanwhile is rotated further anticlockwise so that the walls of cam wheel (19) that delimit the recess (19a) on both sides prevent the guide pin (7) from leaving this widening (15b). As a result, the guide pin (7) is retained in the widening (15b).

During the retention of the guide pin (7), the rotary shaft (3) of the blender (5) is moved further upwards, as a result of which the blender (5) carries out a rotational movement with respect to the retained guide pin (7). This results in a smooth pouring motion.

After the further anticlockwise rotation of the cam wheel (19), the recess (19a) is moved into such a position that the guide pin (7) can leave the widening (15b) and can move in the direction of the right-hand end (a) of the groove (6). The upper boundary of the recess (19a) then prevents the pin (7) from being able to move back upwards out of the recess (15b) and from moving away from the right-hand end (a) of the groove (6) again.

Due to the fact that the drive shaft (1) and the entrainment plate (2) rotate further anticlockwise, the guide pin (7) is moved further up to the right-hand end (a) of the groove (6). In this position (D), the blender (5) is tilted fully to the right, so that the cleaning water is poured from the blender (5) into the collecting tray (23).

This position of the guide pin (7) is detected by means of a fourth microswitch (34). In FIG. 4, the blender (5) is in this position (D).

FIGS. 6 and 7 show the movement mechanism of the without the blender (5) and its attachment plate (4). In the protruding edge portion of the entrainment plate (2), the opening (3') is illustrated in which the rotary shaft (3) of the blender (5) is accommodated.

As already stated above, FIG. 7 also shows that the entrainment plate (2) comprises a cam (2b). When this cam (2b) is in the position indicated in FIG. 7, this means that the blender (5) is in the tilted position (B) and also perfectly adjoins the underside of the sealing element (14). This position of the cam (2b) is detected by the fifth microswitch (33). The result of this detection is that the mixing device is automatically activated.

The invention claimed is:

1. Device for the automatic preparation of a food product, which preparation comprises the mixing of solid ingredients, said device configured to make the prepared food product available to a user in a refreshment receptacle, said device comprising a mixture receptacle, a mixing device to mix the ingredients in the mixture receptacle and a drive device configured to tilt the mixture receptacle automatically from an upright position into a first pouring position after the ingredients have been mixed, in order to allow the mixed ingredients to drop from the mixture receptacle into the refreshment receptacle,
wherein the mixture receptacle is rotatable about a rotary shaft which is movable along a first guide track by the drive device, in that the mixture receptacle comprises a guide element which is configured to be moved along a second guide track, wherein a movement of the rotary shaft according to the first movement path causes a movement of the guide element along the second movement path and moves the mixture receptacle from the upright position into the first pouring position.

2. Device for the automatic preparation of a food product according to claim 1, wherein the device is configured to introduce a cleaning liquid into the mixture receptacle in order to clean the mixture receptacle after the mixed ingredients have been removed from the mixture receptacle in order to then carry out a cleaning operation, and to then automatically tilt the mixture receptacle to a second pouring position in order to pour out the cleaning liquid.

3. Device for the automatic preparation of a food product according to claim 1, wherein the device is configured to introduce a cleaning liquid into the mixture receptacle in order to clean the mixture receptacle after the mixed ingredients have been removed from the mixture receptacle in order to then carry out a cleaning operation, and to then automatically tilt the mixture receptacle to a second pouring position in order to pour out the cleaning liquid, and wherein the guide element is also configured to be moved along a third guide track, wherein a movement of the rotary shaft along the first movement path causes a movement of the guide element along the third movement path and moves the mixture receptacle from the upright position into the second pouring position.

4. Device for the automatic preparation of a food product according to claim 3, wherein the second and the third movement path are determined by two different parts of the same guider.

5. Device for the automatic preparation of a food product according to claim 1, wherein the device comprises an entrainment body which is rotatable by a drive shaft, in that said rotary shaft of the mixture receptacle is connected to the entrainment body in a location which is remote from the drive shaft, and in that the device is configured to rotate the drive shaft automatically so that the entrainment body co-rotates with and the rotary shaft is moved along a first movement path which is substantially in the shape of an arc of a circle.

6. Device for the automatic preparation of a food product according to claim 1, wherein the mixing device comprises a rotatable cutting blade which is situated in the mixture receptacle.

7. Device for the automatic preparation of a food product according to claim 1, wherein the device comprises a carrier for the refreshment receptacle, in that the carrier is movable between a first and a second position in order to move a refreshment receptacle which has been placed thereon into an external position or an internal position, respectively, wherein, in the external position, the refreshment receptacle is in a position in which it is accessible to a user, and wherein, in the internal position, the refreshment receptacle is in a position in which the mixed ingredients can drop into the refreshment receptacle from the mixture receptacle placed in the first pouring position, in that the device comprises a mechanism which comprises a component which is movable by thea drive shaft and is configured to transfer the movement of the component to the carrier during a movement of the mixture receptacle towards the first pouring position, so that the carrier is automatically moved to the second position, and to transfer the movement of the component to the carrier during a movement of the mixture receptacle away from the first pouring position, so that the carrier is automatically moved to the first position.

8. Device for the automatic preparation of a food product, which preparation comprises the mixing of solid ingredients, said device configured to make the prepared food product available to a user in a refreshment receptacle, said device comprising a mixture receptacle, a mixing device to mix the ingredients in the mixture receptacle and a drive device configured to tilt the mixture receptacle automatically from an upright position into a first pouring position after the ingredients have been mixed, in order to allow the mixed ingredients to drop from the mixture receptacle into the refreshment receptacle, wherein the device comprises a carrier for the refreshment receptacle, in that the carrier is movable between a first and a second position in order to move a refreshment receptacle which has been placed thereon into an external position or an internal position, respectively, wherein, in the external position, the refreshment receptacle is in a position in which it is accessible to a user, and wherein, in the internal position, the refreshment receptacle is in a position in which the mixed ingredients can drop into the refreshment receptacle from the mixture receptacle placed in the first pouring position, in that the device comprises a mechanism which comprises a component which is movable by a drive shaft and is configured to transfer the movement of the component to the carrier during a movement of the mixture receptacle towards the first pouring position, so that the carrier is automatically moved to the second position, and to transfer the movement of the component to the carrier during a movement of the mixture receptacle away from the first pouring position, so that the carrier is automatically moved to the first position, wherein the said mechanism comprises: an engagement structure which forms part of the said component or is connected thereto, and an engagement body which forms part of the carrier or is connected thereto, and in that the engagement structure engages with the engagement body during the movement, so that the movement is transferred to the carrier as a result of which the latter is moved.

9. Device according to claim 1, wherein the device comprises feed and metering adders in order to add a specific amount of a liquid ingredient to the mixture receptacle during the preparation stage.

10. Device according to claim 1, wherein the device is configured to prepare a smoothie, and in that the preparation comprises the mixing of pieces of fruit and/or vegetables in a frozen state.

11. Method of offering a refreshment to a consumer which has been prepared in situ at a sales point and the preparation of which involves mixing solid ingredients, wherein
a. a quantity of ingredients in solid form is provided to a consumer,
b. a device for the automatic preparation of a food product, the preparation comprising the mixing of solid ingredients, the device made available to the consumer in the vicinity of the sales point, the device configured to make the prepared food product available to a user in a refreshment receptacle, the device comprising a mixture receptacle, a mixing device to mix the ingredients in the mixture receptacle and a drive device being configured to tilt the mixture receptacle automatically from an upright position into a first pouring position after the ingredients have been mixed, in order to allow the mixed ingredients to drop from the mixture receptacle into the refreshment receptacle,
wherein the mixture receptacle is rotatable about a rotary shaft which is movable along a first guide track by the drive device, in that the mixture receptacle comprises a guide element which is configured to be moved along a second guide track, wherein a movement of the rotary shaft according to the first movement path causes a movement of the guide element along the second movement path and moves the mixture receptacle from the upright position into the first pouring position,
c. the consumer introduces the quantity of ingredients into the device, and
d. the refreshment is prepared automatically in the device and is offered to the consumer.

12. Method of offering a refreshment which has been prepared in situ at a sales point according to claim 11, wherein the ingredients are provided to the consumer in a frozen state and are introduced into the device by the consumer in a frozen state.

13. Method of offering a refreshment which has been prepared in situ at a sales point according to claim 11, wherein the consumer, prior to step a, selects different ingredients or different combinations of two or more different ingredients which are offered at the sales point.

14. Method of offering a refreshment which has been prepared in situ at a sales point according to claim 11, wherein the said quantity of ingredients is sold as a separately packaged unit.

15. Method of offering a refreshment which has been prepared in situ at a sales point according to claim 11, wherein the refreshment is a drinkable refreshment, such as a soup, a milkshake or a smoothie.

16. Method of offering a refreshment which has been prepared in situ at a sales point according to claim 11, wherein the consumer selects different ingredients or different combinations of two or more different ingredients, and places his order via a web application.

\* \* \* \* \*